(12) United States Patent
Patel et al.

(10) Patent No.: US 7,043,225 B1
(45) Date of Patent: May 9, 2006

(54) METHOD AND SYSTEM FOR BROKERING BANDWIDTH IN A WIRELESS COMMUNICATIONS NETWORK

(75) Inventors: Pulin R. Patel, McKinney, TX (US); Raghuram Krovvidi, Irving, TX (US); Ojas T. Choksi, Plano, TX (US); Achal R. Patel, McKinney, TX (US); Kenneth W. Davidson, Plano, TX (US); Mohammad R. Ali, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/513,592

(22) Filed: Feb. 25, 2000

(51) Int. Cl.
*H04M 11/00* (2006.01)
*H04Q 7/20* (2006.01)

(52) U.S. Cl. .................. 455/405; 455/406; 455/404.2; 455/456.1; 455/456.2; 455/456.6

(58) Field of Classification Search ................ 455/405, 455/406, 452, 456, 67.1, 404.2, 456.1, 456.2, 455/456.6; 370/468, 351–352, 401, 328, 370/465
See application file for complete search history.

(56) References Cited

U.S. PATENT DOCUMENTS

| | | | |
|---|---|---|---|
| 5,301,359 A | 4/1994 | Van den Heuvel et al. | 455/56.1 |
| 5,581,802 A * | 12/1996 | Erickson et al. ........... | 455/33.1 |
| 5,594,947 A * | 1/1997 | Grube et al. ................ | 455/54.2 |
| 5,666,356 A | 9/1997 | Fleming et al. ............. | 370/328 |
| 5,862,490 A * | 1/1999 | Sasuta et al. ................ | 455/525 |
| 5,961,569 A * | 10/1999 | Craport et al. .............. | 701/200 |
| 5,987,326 A | 11/1999 | Tiedemann, Jr. et al. ... | 455/442 |
| 6,021,309 A | 2/2000 | Sherman et al. ........... | 455/12.1 |
| 6,064,972 A * | 5/2000 | Jankowitz et al. ............. | 705/7 |
| 6,101,379 A * | 8/2000 | Rahman et al. ............. | 455/406 |
| 6,151,309 A | 11/2000 | Busuioc et al. ............. | 370/328 |
| 6,289,005 B1 | 9/2001 | Katz ........................... | 370/328 |
| 6,304,562 B1 | 10/2001 | Kim et al. ................... | 370/332 |
| 6,324,185 B1 | 11/2001 | Budhraja .................... | 370/468 |
| 6,327,254 B1 | 12/2001 | Chuah ........................ | 370/328 |
| 6,347,224 B1 | 2/2002 | Smyth et al. ................ | 455/406 |
| 6,424,646 B1 * | 7/2002 | Gerszberg et al. .......... | 370/352 |
| 6,618,594 B1 * | 9/2003 | Myers et al. ................ | 455/457 |

* cited by examiner

Primary Examiner—Marceau Milord
(74) Attorney, Agent, or Firm—Baker Botts L.L.P.

(57) ABSTRACT

A method and system for brokering bandwidth in a wireless communications network includes receiving a request for a wireless service at a geographic region. An availability of the wireless service is determined at the geographic region. A response to the request is generated based on the availability of the wireless service. The response includes one or more terms for the wireless service.

55 Claims, 3 Drawing Sheets

METHOD AND SYSTEM FOR BROKERING BANDWIDTH IN A WIRELESS COMMUNICATIONS NETWORK

RELATED APPLICATIONS

This application is related to U.S. patent application Ser. No. 09/513,912 entitled "Method and System for Queuing Traffic in a Wireless Communications Network," U.S. patent application Ser. No. 09/513,913 entitled "Method and System for Managing Transmission Resources in a Wireless Communications Network," U.S. patent application Ser. No. 09/513,914 entitled "Wireless Router and Method for Processing Traffic in a Wireless Communications Network," and U.S. patent application Ser. No. 09/513,090 entitled "Method and System for Configuring Wireless Routers and Networks," all filed on Feb. 25, 2000 and incorporated herein by reference.

TECHNICAL FIELD OF THE INVENTION

The present invention relates generally to the field of wireless communications, and more particularly to a method and system for brokering bandwidth in a wireless communications network.

BACKGROUND OF THE INVENTION

Wireline Internet protocol (IP) networks have traditionally supported a best effort delivery of all traffic. To support enhanced services, multiple types, or classes, of services have been established and assigned certain quality of service (QoS) parameters that manage queues for each service type. The QoS parameters include delay, jitter, error rates, and throughput. The QoS parameters can be provisioned on a per IP connection or per flow basis through mechanisms such as resource reservation protocol (RSVP) or can be provisioned on aggregate flows which are classified into service classes. Internet service providers (ISPs) can utilize the service classes, their associated QoS behavior and QoS provisioning to provide tiered service offerings to their business and consumer consumers.

The IP QoS architecture provides tools for marking IP flows, controlling and shaping the traffic of various IP flows, and managing various IP queues in order to ensure QoS behavior for each class of service. Queue management algorithms include head-drop, tail-drop, first in first out (FIFO) and random early detect (RED). The queue management may be on individual microflows or on aggregate flows which are treated with similar QoS behavior.

Recent proposals for the IP QoS architecture include supporting bandwidth brokers that control and allocate Internet or other network bandwidth. The bandwidth brokers can be programmed with an organization's policies, current allocation traffic, and new requests for allocations. The bandwidth brokers manage the allocations of bandwidth within their network domain and communicate with bandwidth brokers of other network domains to negotiate QoS parameters.

Wireless communications networks use the IP QoS architecture to support transmission of data and/or voice traffic between mobile devices and a wireline network. Typically, wireless consumers sign-up for wireless telephony and data services in a defined coverage area at a specified QoS policy and price. Once outside the coverage area, the wireless services may not be available to a consumer or may only be available at an unknown price and QoS policy. This limits true mobility of the devices within a wide geographic area.

SUMMARY OF THE INVENTION

The present invention provides a method and system for brokering bandwidth in a wireless communications network that substantially eliminate or reduce problems and disadvantages associated with previous methods and systems. In particular, wireless bandwidth in a region is brokered to consumers for specified periods of time at agreed upon terms. This allows discreet segments of bandwidth to be commercialized and bandwidth use in the network to be maximized.

In accordance with one embodiment of the present invention, a method for brokering resources of a wireless communications network includes receiving a request for a wireless service at a geographic region. The availability of the wireless service at the geographic region is determined. A response to the request is generated based on the availability of the wireless service. The response includes one or more terms for providing the wireless service.

More specifically, in accordance with a particular embodiment of the present invention, the request may identify a time, a bandwidth, a type of service, and/or a price for the wireless service. In this embodiment, the availability of the wireless service is determined at the geographic region at the specified time, bandwidth, type and/or price. Terms in the response may include additional or different time, price, type of service and/or bandwidth terms for the wireless service. The terms may be negotiated between a consumer or agent for the consumer and a bandwidth provider such as a network or service provider or agent for the network or service provider.

Technical advantages of the present invention include providing a method and system for brokering bandwidth in a wireless communications network. In particular, wireless resources are brokered on a geographic location, time including date or dates and time of day or days, bandwidth, type of service and/or price basis. As a result, discrete segments of bandwidth may be commercialized to maximize bandwidth use in each area of the wireless network.

Another technical advantage of the present invention includes providing a method and system for consumers to obtain wireless resources. In particular, consumers may specify resource location, price, QoS policy and other parameters to bandwidth providers including service providers, network providers and bandwidth brokers, shop between providers and negotiate service parameters. Thus, consumers can narrowly specify the services they are interested in and limit the price they are willing to pay for the services.

Yet another technical advantage of the present invention includes providing a method and system for consumers to obtain temporary wireless resources outside their normal coverage area. In particular, wireless resources may be directly or indirectly negotiated with and reserved from a service provider at a remote geographic location. Thus, a mobile user may be assured adequate wireless resources when he or she travels to the geographic location. The wireless resources may be reserved from a service provider, bandwidth broker, travel or other agent, or directly from the network provider and may be reserved through the Internet or other network, a kiosk or other terminal, a phone line, a handset by data input, voice or other commands.

Yet another technical advantage of the present invention includes providing an Internet gateway for brokering and negotiating wireless transmission resources between users and service providers. In particular, a web site is provided at which consumers may specify a location, time, bandwidth, type of service and/or pricing of desired services and submit request for services. In this way, consumers may easily request and negotiate with network providers, service providers and bandwidth brokers for wireless services.

Still another technical advantage of the present invention includes providing a method and system for bandwidth providers to broker available bandwidth to consumers. In particular, network providers, service providers, and bandwidth brokers may advertise and display available bandwidth for purchase by consumers. Bandwidth may be prepackaged in plans that specify all parameters to eliminate negotiations and facilitate purchase by consumers. Based on supply and demand, available bandwidth may be auctioned between consumers or consumer requests auctioned between bandwidth providers. Moreover, unsolicited advertisements may be sent to consumers to inform them of the available bandwidth. In this way, bandwidth usage within a network is maximized.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with accompanying drawings, wherein like reference numerals represent like parts, in which.

DETAILED DESCRIPTION OF THE INVENTION

Figure 1:
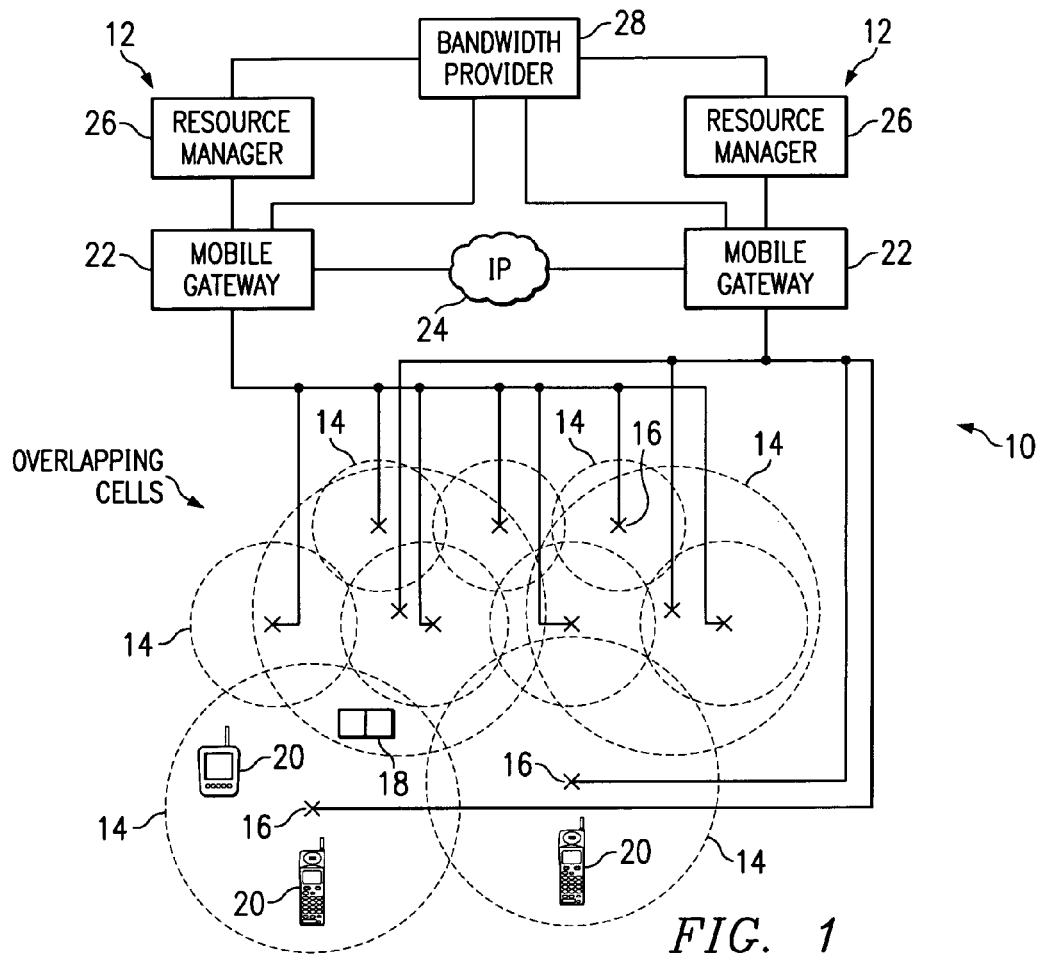
FIG. 1 is a block diagram illustrating a wireless communications network in accordance with one embodiment of the present invention.

FIG. 1 illustrates a wireless network 10 in accordance with one embodiment of the present invention. In this embodiment, the wireless network 10 comprises a plurality of overlapping cellular networks 12 in which terrestrial and mobile wireless transmission originates in geographically delimited cells. It will be understood that the present invention may be used in connection with satellite and other suitable types of wireless and other dynamic bandwidth networks.

Referring to FIG. 1, the cellular networks 12 each cover a contiguous area that is broken down into a series of overlapping cells 14. Each cell 14 has a base station, or server, 16 and may be subdivided into a plurality of geo-location areas 18. The geo-location areas 18 are each a defined area in which bandwidth may be allocated to mobile devices 20. The geo-location areas 18 may have a resolution greater than, less than, or equal to cell size. In a particular embodiment, the geo-location areas 18 are substantially square in shape to form a contiguous grid over the coverage area. Thus, the geo-locations 18 may be shared by one or more cells 14. Further information regarding the geo-location areas and allocation of bandwidth in the areas is described in co-owned U.S. patent application Ser. No. 09/466,308, filed Dec. 17, 1999, entitled "Method and System for Allocating Bandwidth in a Wireless Communications Network," which is hereby incorporated by reference.

Servers 16 provide a radio frequency (RF) link for mobile devices 20 in a corresponding cell 14. The wireless RF link to the mobile devices 20 in the cell 14 may be based on established standards such as IS-54 (TDMA), IS-95 (CDMA), GMS and AMPS, 802.11 based WLAN, or new upcoming standards such as CDMA 2000 and W-CDMA or proprietary terrestrial or mobile radio interfaces. The mobile devices 20 may be cell phones, data phones, data devices, portable computers, or any other suitable devices capable of communicating information over a wireless link.

Due to the nature of the RF airlink, the interference generated by the usage of various mobile devices 20 is inter-dependent. That is, the interference generated by the usage of a mobile device 20 including transmitting and receiving signals is not only dependent on its geo-location, but is also dependent on the geo-location of surrounding mobile devices 20 and the usage of those devices. Thus, each cellular network 12 is an inherently interference-limited network with bandwidth usage in a particular location impacting the interference in specific areas of the neighborhood. In the complete spectrum sharing systems such as CDMA and W-CDMA, bandwidth usage in a particular area directly impacts the bandwidth available at different locations in the neighborhood.

The servers 16 each have a defined bandwidth with which to communicate with the mobile devices 20 in the corresponding cell 14. The bandwidth is used by the server 16 and the mobile devices 20 to communicate voice and data information. The supported bandwidth is a function of various factors such as frequency reuse, carrier to interface ratio, bit-energy to noise ratio, effective bit-rate per connection and the like. The bandwidth available to allocate to certain flows is geo-location dependent, and time dependent based on current usage of other flows in the geo-neighborhood.

The servers 16 in each cellular network 12 are connected to one or more mobile gateways 22 that allocate bandwidth within the cellular network 12, route traffic, and track the location of the mobile devices 20 in the cells 14. The mobile gateways 22 may group, allocate, and control traffic and transmission resources as described in co-owned U.S. patent applications entitled "Method and System for Queuing Traffic in a Wireless Communications Network" and "Method and System for Managing Transmission Resources in a Wireless Communications Network," both previously incorporated by reference. The position of a mobile device 20 may be determined using network-assist, global position systems (GPS) and RF fingerprinting. Preferably, the positioning technique provides fast and accurate information with respect to the location of the mobile device 20 to minimize acquisition time for position information. As mobile users move from cell 14 to cell 14 within a cellular network 12, a hand-off operation between servers 16 is performed by the mobile gateway 22.

The mobile gateways 22 in each cellular network 12 provide connectivity from the wireless portion of the cellular network 12 to a wireline portion 24 of the wireless network 10 via circuit switched and packet switched wireless data protocols. The wireline portion 24 may be the Internet, intranet, extranet, or other suitable local or wide area network. For the Internet, the mobile gateways 22 provide an access, or entry point for all transport control protocol/Internet protocol (TCP/IP) data connections to the wireless portion of the network 12. Each mobile gateway 22 may serve one or more servers 16 include the RF front-end and other functionality of the servers 16, and/or may be wireless routers as described in co-owned U.S. patent application entitled "Wireless Router and Method for Processing Traffic in a Wireless Communications Network," previously incorporated by reference. In the later case, the wireless router may be self-configuring as described in co-owned U.S. patent application entitled "Method and System for Configuring Wireless Router and Network," also previously incorporated by reference. Bandwidth allocation and other functionality of the mobile gateways 22 may instead be implemented by a mobile switching center (MSC), data interworking function (IWF) devices, and other suitable network devices without departing from the scope of the present invention.

In each cellular network 12, a service level agreement (SLA), or resource manager 26 manages bandwidth and other suitable network resources of the network provider. As described in more detail below, the resource manager 26 receives requests for wireless services from a consumer, service provider, bandwidth broker or other requester, determines resource availability based on the request, generates a response based on resource availability, and sends the response to the requester. The request and reply may each be an offer to accept or provide services, an acceptance of an offer, or a partial offer to accept or provide services including both specified and open terms. Based on the request and the response, additional negotiations may occur between the resource manager 26 and the requester in order to agree on terms at which the wireless service will be provided. The agreed upon terms define a SLA and may specify a wireless region, price, time, type of service, bandwidth and other suitable conditions of service. The SLA will be checked and enforced/ensured by the network elements during use of the wireless service as packets are transmitted over the cellular network 12.

In a particular embodiment, the resource manager 26 is a distributed server component with separate or shared instances. In this embodiment, a customer premise equipment (CPE) may install the resource manager 26 locally or lease/share an instance installed at a server premise equipment (SPE) data center location. Thus, the SPE will maintain a local installation of the resource manager 26. The relationship between the SPE and CPE resource managers 26 may be one-to-many or many-to-many.

One or more bandwidth providers 28 communicate with the resource managers 26 of the cellular networks 12 and/or mobile gateways 22 within the cellular networks 12 to intelligently broker bandwidth and other suitable wireless resources of the network providers to third parties based on time and space considerations such as geo-location of the demand and supply within the networks 12. The bandwidth providers may be a service provider such as an Internet Service Provider (ISP) or a bandwidth broker. The bandwidth broker may broker bandwidth of a service provider in addition to that of a network provider. As described in more detail below, the bandwidth providers 28 may receive requests for wireless services directly from consumers and broadcast the request to network providers capable of providing the specified wireless services. The bandwidth provider 28 receives, analyzes and/or evaluates responses from the different network providers to generate a consumer response. The consumer response may include an offer to provide wireless services at specified terms, several offers from several different network providers for evaluation and selection by the consumer, or one or more partial offers with open terms to be negotiated with the consumer. The bandwidth provider 28 may also negotiate with network providers on behalf of consumers or facilitate negotiations between consumers and network providers. After an agreement has been reached, the bandwidth provider 28 may process billing, termination and other suitable transactions regarding the wireless services.

Figure 2:
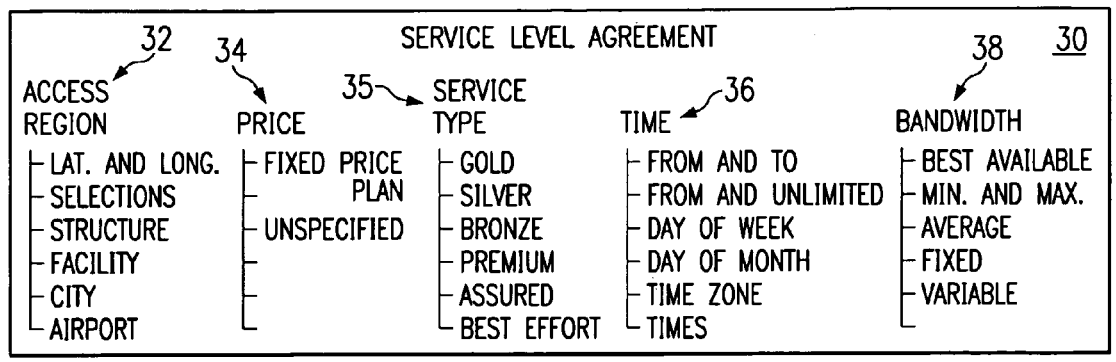
FIG. 2 is a block diagram illustrating wireless service terms in accordance with one embodiment of the present invention.

FIG. 2 illustrates wireless service terms for a service level agreement (SLA) 30 in accordance with one embodiment of the present invention. In this embodiment, the SLA 30 includes access region parameters 32, price parameters 34, service type parameters 35, time parameters 36, and bandwidth parameters 38. The access region parameters 32 include latitude and longitude, selections, structures, facilities, cities, airports, and any other suitable area that can be identified for provision of wireless services. The price parameters 34 include fixed price, variable price, price plans, discounts, and other suitable pricing strategies. The service type parameters 35 include different class or quality of service (QoS) types such as gold, silver, bronze, premium, assured, and best efforts. The time parameters 36 include a from and to time for services, if from an unlimited time for services, a day of the week and/or month for services, a time zone and any other suitable times at which wireless services may be provisioned. The bandwidth parameters 38 include best available, a minimum and maximum, an average, fixed, variable, or other suitable level of bandwidth.

Figure 3:
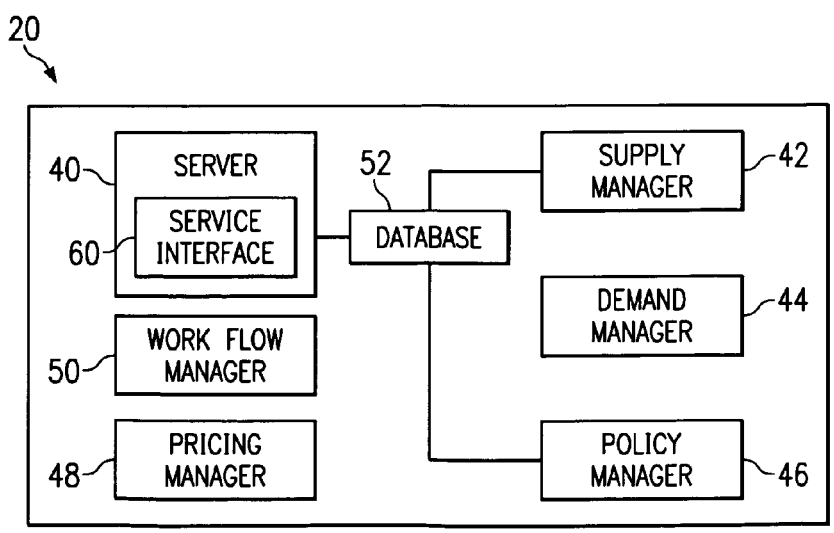
FIG. 3 is a block diagram illustrating details of the resource manager of FIG. 1 in accordance with one embodiment of the present invention.

FIG. 3 illustrates details of the resource manager 26 in accordance with one embodiment of the present invention. In this embodiment, the resource manager 26 is implemented as a centralized system for controlling bandwidth within a cellular network 12. It will be understood that functionality of the resource manager 26 may be suitably distributed within the cellular network 12.

Referring to FIG. 3, the resource manager 26 includes a server 40, a supply manager 42, a demand manager 44, a pricing manager 46, a policy manager 48, and a work flow manager 50. A database 52 is shared by the server 40 and the managers 42, 44, 46, 48 and 50. Each of the server and managers 40, 42, 44, 46, 48 and 50 may be implemented in hardware, software stored in a computer-readable medium, a combination of hardware and software or any other computer processable medium having hardwired or programmed instructions. The hardware may comprise a field programmable gate array (FPGA) programmed to perform some or all of the functionality of the resource manager 26, an application specific integrated circuit (ASIC) designed to perform some or all of the functionality of the resource manager 26 and/or a general purpose processor programmed by software instructions to perform some or all the functionality of the resource manager 26.

The server 40 includes a service interface 60 through which consumers, including their agents, and bandwidth providers 28 may request wireless services in the cellular network 12. As described in more detail below, the service interface 60 is a web or other Internet site, a destination e-mail or electronic data interchange (EDI) site, an automated call attendant line, a voice activated instruction line, a fax line, an operator entry device, or other suitable device through which consumers and bandwidth provider 28 may request wireless services. The service interface 60 allows consumers and bandwidth provider 28 to specify geographic access regions, price, bandwidth, type of service and/or other suitable parameters for wireless services. The service interface 60 also communicates responses to requests back to the service requester and allows for negotiations between the service requester and bandwidth provider 28. After terms for wireless services have been agreed to with or for a customer, the server 40 stores the SLA for the service in the database 52.

The supply manager 42 maintains current and expected available supply information and/or maps for the cellular network 12. The demand manager 44 maintains current and expected demand information and/or maps for the cellular network 12. The pricing manager 46 maintains pricing information and/or maps for the cellular network 12. The supply, demand, and pricing maps are dynamic and may be location and time dependent. The dynamic supply, demand, and pricing maps may be stored in the database 52 and updated by their respective managers 42, 44 and 46.

The policy manager 48 provisions policies in the mobile gateways 22 based on an SLA with a consumer or bandwidth provider 28. In particular, the policy manager 48 communicates with the mobile gateways 22 to provision services in the cellular network 12. The work flow manager 50 controls the service interface 60 and business process within the resource manager 26. The work flow manager 50 may operate in real time or non-real time. In addition, each stage of the work flow may be synchronous or asynchronous.

In operation, requests for wireless services may be received by the resource manager 26 electronically via an EDI, graphical user interface (GUI) of an Internet or other suitable site, GUI, voice or vision activated, pen stroke, key stroke or touch screen interface of a cell phone, PDA or other mobile device, or by automated telephony systems in which consumers and bandwidth providers 28 may select access regions and other parameters for wireless services. Requests may also be received by an operator keying in information from a caller, a fax, e-mail or other suitable notification. Each request may include mandatory and/or optional parameters that will be used by the resource manager 26 to determine resource availability. In one embodiment, the mandatory parameters may include the wireless access region for the wireless service. The region may be a large geographic region such as a city, a facility such as an airport, convention center, hotel, or a specific geo-location area 16. Additional parameters may include rate/pricing plans, a time window or start time, required bandwidth, and/or type of service.

In the CPE/SPE embodiment, manual requests for wireless services may be re-keyed by an operator via a GUI on the SPE resource manager 26. Electronic requests are received by the CPE resource manager 26 and forwarded to the corresponding SPE resource manager 26. The SPE resource manager 26 performs validation on the request by checking the content for well formedness and validity.

In a particular embodiment, the request may be a request for information on available wireless services, a request for reservation of future wireless services, a request for immediate wireless services, or a confirmation request. Depending on the type of the request, the resource manager 26 will check for available resources and return a response based on the availability of resources. For inquiry type requests, the resource manager 26 returns information about availability and pricing of wireless services. For reservation types of requests, the resource manager 26 returns a successful or unsuccessful reservation along with availability and pricing information. In case of unsuccessful reservation results, the resource manager 26 may return alternatives available for bandwidth and pricing. After returning the result, the resource manager 26 stores the request and flags for confirmation. The request will also be flagged for a specific expiry period. If confirmation is received after the expiry period, the request will be invalidated.

For instant request types, the resource manager 26 returns an acceptance or decline response along with information about availability and pricing of wireless resources. For confirmation requests, the resource manager 26 checks if the confirmation falls within the expiry period range. If the confirmation period has expired, a reservation expired response will be returned to the requester. If the confirmation is made within the expiry period range, the resource manager 26 will confirm provision of the wireless service.

Figure 4:
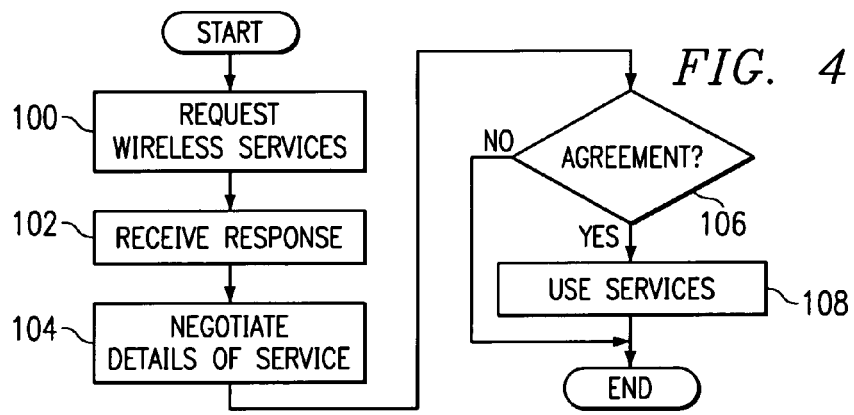
FIG. 4 is a flow diagram illustrating a user method for obtaining wireless resources in accordance with one embodiment of the present invention.

FIG. 4 is a flow chart illustrating a user method for obtaining wireless services in accordance with one embodiment of the present invention. The method begins at step 100 in which a potential consumer requests wireless services from a bandwidth provider 28 or other intermediate agent. As previously described, the request may be submitted manually by calling an operator, sending a fax, or sending an e-mail to the wireless service provider or intermediary, or electronically by sending an EDI message accessing an Internet site and entering parameters specifying the wireless services or from any other graphical, voice, vision, key stroke, pen stroke, or other interface through which request may be submitted or offers reviewed or requested. The consumer request may be automated to be generated in response to activation of a mobile device 20 outside of a predefined coverage area or within a predefined coverage area or type of coverage area. Thus, for example, a car phone may upon activation automatically determine that it is outside a normal coverage area and request information on available bandwidth or generate request for bandwidth based on predefined pricing, service type and/or bandwidth parameters. Parameters may be mandatory or optional and may include a coverage region, rates/pricing plans, time, bandwidth, and types of service.

Proceeding to step 102, the potential consumer receives a response from the bandwidth provider 28. The consumer may accept a service plan offered in the response or may negotiate details of the wireless service with the bandwidth provider 28 at step 104. Thus, if a consumer cannot obtain a requested level of wireless resources at a specified price, the consumer may choose to accept a lower level of resources at the specified price or pay an offered price for the specified level of wireless resources.

Proceeding to decisional step 106, if an agreement is reached with a bandwidth provider, the Yes branch leads to step 108 in which the consumer may use the agreed upon wireless services. The wireless services may be requested in real-time for immediate use or requested for use at a specified future time. During use of the wireless service, the mobile device 20 may track and/or display charges based on the SLA 30. Thus, if the consumer is travelling to a remote geographic location, the consumer may first reserve wireless resources at that location to be assured of adequate coverage while at that location. Returning to decisional step 106, if no agreement is reached, the No branch of decisional step 106 leads to the end of the process. Thus, consumers may determine ahead of time the cost of wireless services and decide whether or not to proceed with the services based on the cost.

For automatically generated requests, a mobile device may have one or more sets of defined parameters with which it can negotiate for wireless services. Thus, for example, a mobile device may automatically negotiate and agree to wireless services that fall within specified pricing, service type and/or bandwidth parameters for all calls, automatically negotiate and agree to wireless services falling within a second set of parameters for calls to or from identified individuals or business, and require user approval for wireless services above or below specified pricing, service type and/or bandwidth parameters. Further still, wireless services above ceiling parameters may be automatically rejected by the mobile device 20. For emergency calls, the mobile device may accept any available bandwidth regardless of pricing, service level and/or bandwidth parameters.

Figure 5:
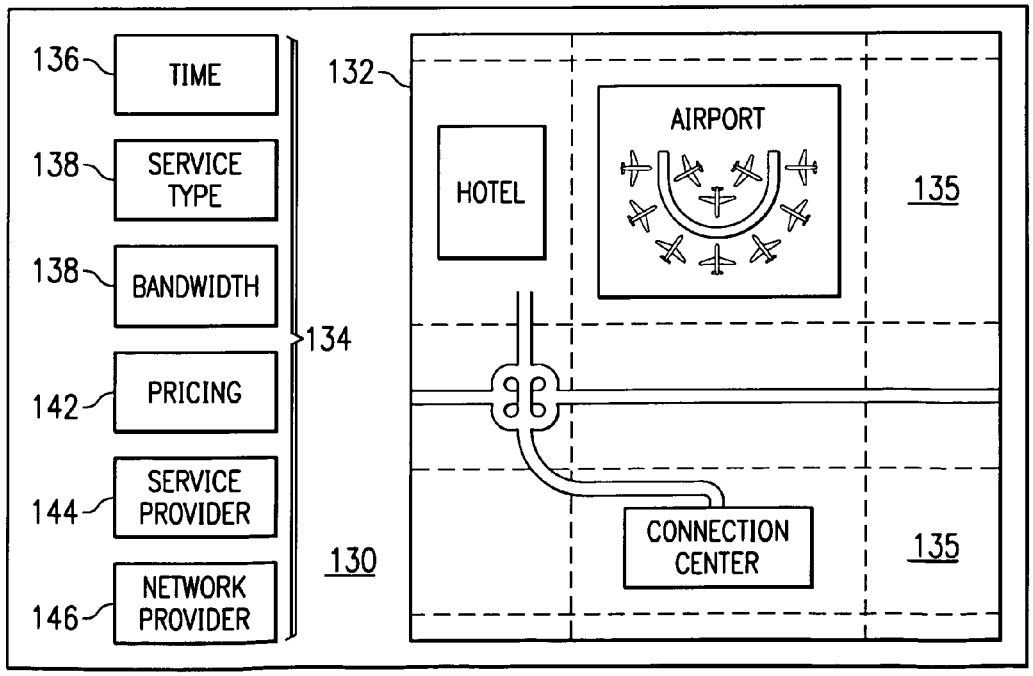
FIG. 5 is a screen diagram illustrating a user interface for obtaining wireless resources in accordance with one embodiment of the present invention.

FIG. 5 illustrates details of the service interface 60 in accordance with one embodiment of the present invention. In this embodiment, the service interface 60 is a graphical user interface 130 accessible by consumers and bandwidth providers 28 over the Internet or other suitable network or on the mobile device handset. The graphical user interface 130 allows consumers to easily request and negotiate with bandwidth providers 28 for wireless services. The geographical interface may instead be implemented in the mobile device 20. Other suitable interfaces for the mobile or other device include keystroke, pen stroke, touch screen, voice activated and vision activated.

Referring to FIG. 5, the graphical user interface 130 includes an interactive map 132 by which wireless access regions for a wireless service may be specified and a plurality of parameter buttons 134 by which additional parameters for the wireless service may be specified. The interactive map 132 may display wireless access regions 135 overlayed on a map of the physical terrain. The wireless access regions may correspond to a geo-location area, portion of a cell site, one or more cell sites, a physical structure such as an airport, complex, or building or any other suitable region in which bandwidth can be allocated. The service requester may zoom in and zoom out on the map to target specific wireless access regions 135. The service requester may then select displayed access regions for provision of wireless services. The service requester may also draw a wireless access region free form, select a center region and radius of operation or otherwise suitably specify a region in which wireless services are being requested.

The parameter buttons 134 allow the service requester to specify time, service type, bandwidth, and pricing parameters for the wireless service at the identified geographic location. In particular, the time button 136 allows the service requester to enter a time window or a start time for wireless services. In the latter case, wireless services may terminate upon notice from the consumer or termination of a call. The service type button 138 allows the service requester to specify a class of service to be provided. The bandwidth button 140 allows the service requester to specify bandwidth requirements for the service. The pricing button 142 allows the service requester to specify pricing information for the service. The service provider button 144 allows the service requester to specify a preferred service provider, such as an ISP. The network provider button 146 allows the service requester to specify a preferred network provider. Thus, a service requester may specify one or more of the parameters for service using the graphical interface 130. Information entered into the graphical interface 130 is used to generate a request for transmission and evaluation by bandwidth providers. Responses from bandwidth providers may be displayed to the service requester in the graphical interface 130. In addition, the service requester may negotiate parameters through the graphical interface 130 with bandwidth providers.

In another embodiment, available wireless resources in a cellular network 12 may be displayed in a graphical user interface 130 for purchase by consumers. In this embodiment, wireless service plans including predefined location, time, service type, bandwidth and/or pricing information may be displayed for selection by consumers. Thus, bandwidth providers 28 may periodically advertise available bandwidth and packaged service plans to facilitate purchase by consumers. If demand exceeds supply, available resources may be auctioned between consumers over the Internet or other medium. In addition, unsolicited advertisements may be sent to consumers to advertise available service plans and/or packages.

Consumers may also request wireless resources and/or receive advertisement and offers for wireless resources through a handset. In this embodiment, consumers may select packages, specify and negotiate terms through a voice-activated interface, call-attended interface, or operator. Thus, services for a device can be obtained directly through the device without need to access a computer or other device.

Figure 6:
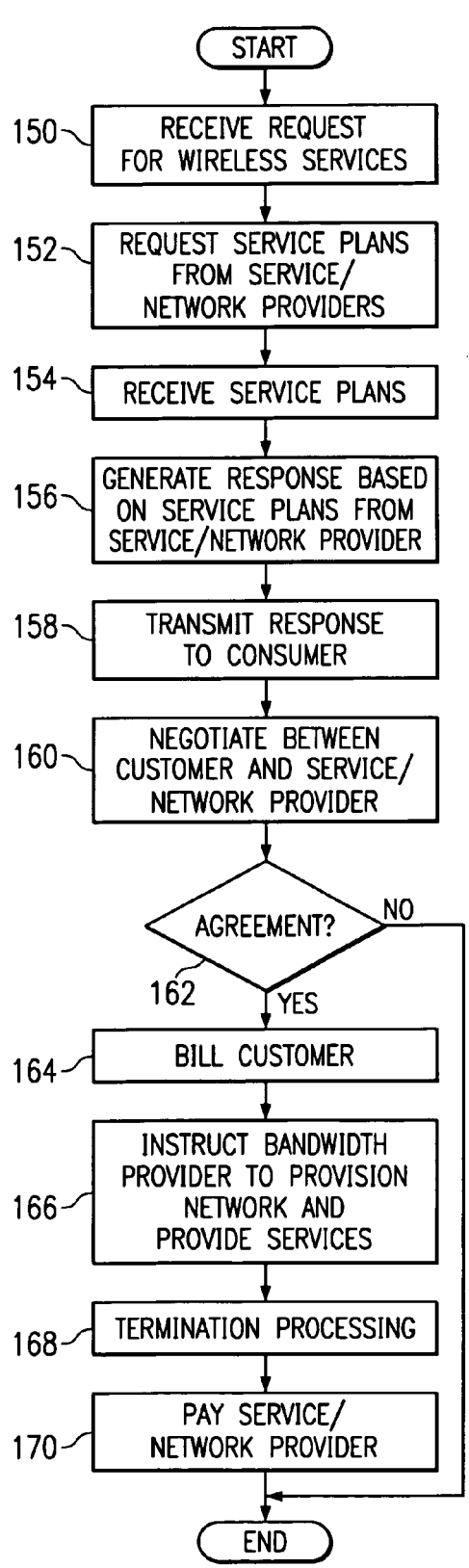
FIG. 6 is a flow diagram illustrating a method for brokering wireless services of a plurality of service providers to consumers in accordance with one embodiment of the present invention.

FIG. 6 is a flow diagram illustrating a method for brokering wireless services of a plurality of network (or service) providers in accordance with one embodiment of the present invention. The method begins at step 150 in which a request for wireless services is received by the bandwidth provider 28. The request may be received at the graphical user interface 130 or any other suitable interface through which a consumer may specify parameters for the wireless service.

Next, at step 152, the bandwidth provider 28 requests service plans from network providers covering an access region identified by the request for wireless services. The identified location may be a specific location, such as an airport, convention center, or hotel, or may be a larger geographic region such as a city or portion of a city.

Proceeding to step 154, the bandwidth provider 28 receives service plans from network providers capable of providing the requested wireless service or a modification of the requested wireless service. At step 156, the bandwidth provider 28 generates a response based on the service plans from the network providers. The response may include the lowest priced plan that includes all parameters specified by the consumer, a number of plans for evaluation and selection by the consumer, or an aggregation of different portions of service plans from different network providers to best meet the parameters specified by the user.

At step 158, a response is transmitted to the consumer for evaluation, negotiation, and/or acceptance. At step 160, the bandwidth provider 28 handles negotiations between the consumer and the network provider. During these negotiations, location, time, type, bandwidth, pricing and other suitable parameters of the wireless service may be negotiated, discussed and agreed to between the consumer and the network provider.

Proceeding to decisional step 162, if an agreement cannot be reached through negotiations, the No branch leads to the end of the process and no agreement is reached. Wireless services may nevertheless be provided in accordance with preexisting SLAs. Thus, a consumer will be able to determine ahead of time the price and limits of wireless services and may choose to accept or reject the conditions at which the service will be provided. If an agreement is reached, an SLA is generated and the Yes branch of decisional step 162 leads to step 164. At step 164, the consumer is billed by the bandwidth provider 28. Next, at step 166, the bandwidth provider 28 instructs the network provider to provision the cellular network 12 to provide the agreed upon services. After the services have been used by the consumer, the bandwidth provider 28 performs termination processing at step 168. At step 170, the bandwidth provider 28 forwards payment to the network provider for services rendered. Step 170 leads to the end of the process by which bandwidth providers 28 provide wireless services to consumers. In this way, discrete segments of bandwidth may be commercialized to maximize bandwidth use in each area of a wireless network.

Figure 7:
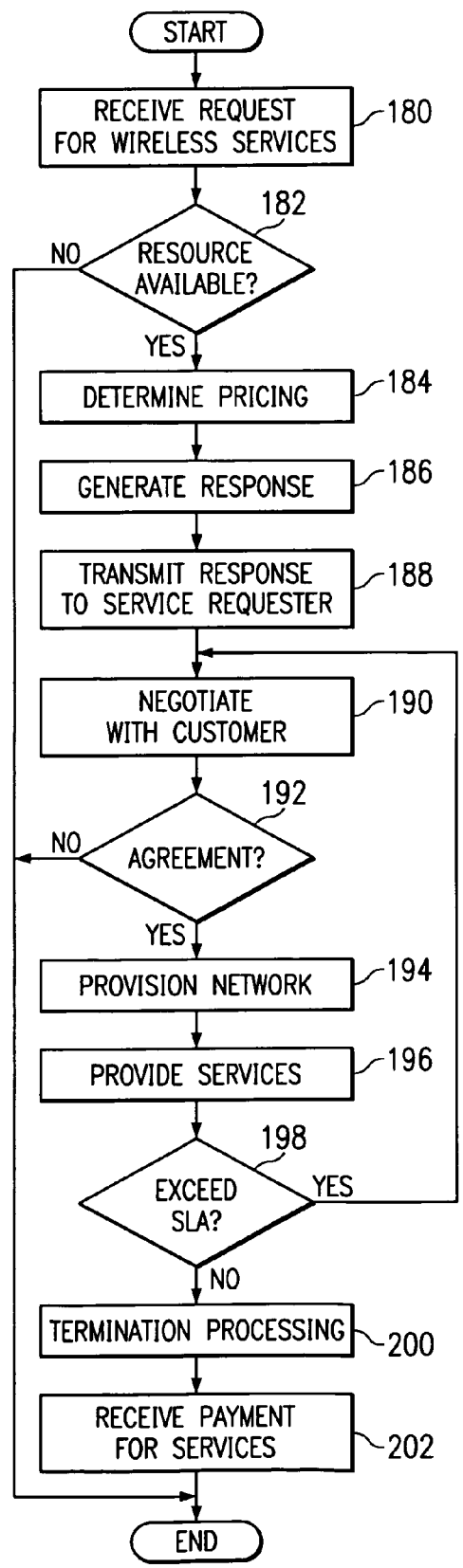
FIG. 7 is a flow diagram illustrating a service provider method for providing wireless resources to consumers in accordance with one embodiment of the present invention.

FIG. 7 is a flow diagram illustrating a network (or service) provider method for providing wireless services to consumers in accordance with one embodiment of the present invention. The method begins at step 180 in which the request for wireless services is received by the resource manager 26. As previously described, the request may be received directly from a consumer or from a bandwidth provider 28.

Proceeding to decisional 182, the resource manager 26 determines resource availability based on the request. Resource availability may include whether wireless service is available at a specified geographic location or approximate geographic location, at a specified time, at a specified service type, at a specified bandwidth and/or at a specified price.

If wireless resources for the request are not available, the No branch of decisional step 182 leads to the end of the process. In this case, the service provider does not have the additional bandwidth to sell and is not overextended by agreeing to provide services for which resources are not available. Alternatively, if some bandwidth is available, the bandwidth provider may offer that bandwidth in reply to the request and negotiate terms for that bandwidth. If sufficient resources are available or substantially sufficient resources are available, the Yes branch of decisional step 182 leads to step 184. At step 184, the resource manager 26 determines pricing from the pricing manager 48. At step 186, the resource manager 26 generates a response based on resource availability and pricing information. The response may include additional and/or altered terms to the request. At step 188, the response is transmitted to the service requester.

At step 190, the network provider may negotiate with the service requester to finalize terms at which the wireless services will be provided. If an agreement is not reached, the No branch of decisional step 192 leads to the end of the process. In this case, no agreement could be reached and accordingly wireless services will be provided only in accordance with any pre-existing SLAs. Thus, the consumer may determine ahead of time the cost of wireless services and decide whether to proceed with the services based on the cost. If an agreement is reached, the Yes branch of decisional step 192 leads to step 194. At step 194, the resource manager 26 generates and stores the SLA for provisioning of the services. As previously described, the services are provisioned in the mobile gateways 22 upon activation of the consumer's mobile device 20.

Next, at step 196, services are provided in accordance with the SLA between the consumer and the bandwidth provider. At decisional step 198, if the consumer leaves the agreed upon access region, exceeds the agreed upon time or otherwise is outside the agreed upon terms for the wireless services, the Yes branch returns to step 190 in which terms for the wireless service may be dynamically renegotiated and a new SLA generated and stored as previously described. If use of the wireless services does not exceed the SLA, then upon completion of the wireless service, the No branch of decisional step 198 leads to step 200. Termination processing is performed at step 200. At step 202, payment for the provided services is received directly from the consumer or from a bandwidth provider 28 through which the services were sold. Step 202 leads to the end of the process in which the network provider is able to determine resource availability and to sell bandwidth to consumers and other bandwidth providers 28 at specified conditions.

Although the present invention has been described with several embodiments, various changes and modifications may be suggested to one skilled in the art. It is intended that the present invention encompass such changes and modifications as fall within the scope of the appended claims.

What is claimed is:

1. A method for brokering resources of a wireless communications network, comprising:
    providing a service interface allowing a user of a remote communications device to select one or more geographic regions for which the user desires wireless service coverage for the remote communications device;
    receiving at a centralized brokerage manager via the service interface a request from the user for a wireless service at a particular geographic region selected by the user via the service interface;
    selectively determining an availability of the wireless service for at least two service providers available at the selected geographic region based on the request;
    generating a first response to the request based on the availability of the wireless service at the selected geographic region, the first response including one or more terms for the wireless service including at least one option between the at least two service providers;
    communicating the first response to the remote communications device; and
    receiving a second response to the first response, the second response selecting at least one of the at least two service providers to provide the wireless service.

2. The method of claim 1, further comprising:
    the request identifying a time for the wireless service; and
    determining the availability of the wireless service at the selected geographic region at the time.

3. The method of claim 1, further comprising:
    the request identifying a bandwidth for the wireless service; and
    determining the availability of the wireless service at the selected geographic region for the bandwidth.

4. The method of claim 1, further comprising:
    the request identifying a type of service for the wireless service; and
    determining the availability of the wireless service at the selected geographic region for the type of service.

5. The method of claim 1, further comprising:
    the request identifying a price for the wireless service; and
    determining the availability of the wireless service at the selected geographic region at the price.

6. The method of claim 1, further comprising:
    the request identifying a network provider for the wireless service; and
    determining the availability of the wireless service at the selected geographic region from the network provider.

7. The method of claim 1, further comprising:
the request identifying a service provider for the wireless service; and
determining the availability of the wireless service at the selected geographic region from the service provider.

8. The method of claim 1, the terms in the response comprising a time for the wireless service.

9. The method of claim 1, the terms in the response comprising a price for the wireless service.

10. The method of claim 1, the terms in the response comprising a type of service for the wireless service.

11. The method of claim 1, the terms in the response comprising a bandwidth for the wireless service.

12. The method of claim 1, the terms and the response comprising a network provider for the wireless service.

13. The method of claim 1, the terms and the response comprising a service provider for the wireless service.

14. The method of claim 1, the response comprising an offer for the wireless service, further comprising providing the wireless service in response to acceptance of the terms by a user.

15. The method of claim 1, further comprising:
broadcasting the request to a plurality of network providers each having a wireless access network covering at least part of the selected geographic region;
receiving a service plan from at least one of the network providers, the service plan based on an availability of the wireless service at the selected geographic region in the wireless access network of the network provider; and
generating the response based on service plans from the network providers.

16. The method of claim 1, wherein providing the service interface comprises providing an Internet site including a graphical user interface configured to receive the user's request for the wireless service at the selected geographic region.

17. The method of claim 16, the graphical user interface configured to receive a plurality of service criteria, the service criteria comprising a geographic region, a price, a type of service, a bandwidth, and a time for the wireless service.

18. The method of claim 16, the graphical user interface further comprising a graphical map displaying geographic areas for selection of the geographic region for which the user desires wireless service coverage for the remote communications device.

19. The method of claim 1, wherein providing the service interface comprises providing a graphical user interface on a mobile device, the graphical user interface configured to receive the request for the wireless service at the selected geographic region.

20. The method of claim 19, the graphical user interface configured to receive a plurality of service criteria, the service criteria comprising a geographic region, a price, a type of service, a bandwidth, and a time for the wireless service.

21. The method of claim 19, the graphical user interface further comprising a graphical map displaying graphic areas for selection of the geographic region for which the user desires wireless service coverage for the remote communications device.

22. The method of claim 1, wherein providing the service interface comprises providing a telephony site including voice activated commands configured to receive the request for the wireless service at the selected geographic region.

23. The method of claim 22, the telephony site configured to verbally receive a plurality of service criteria, the service criteria comprising a geographic region, a price, a type of service, a bandwidth, and a time for the wireless service.

24. The method of claim 1, further comprising negotiating at least one of a plurality of service criteria for the wireless service with the user requesting the wireless service, the service criteria comprising a geographic region, a price, a type of service, a bandwidth, and a time for the wireless service.

25. The method of claim 24, the service criteria comprising at least one of a network provider and a service provider.

26. A system for brokering resources of a wireless communications network, comprising:
computer implementable instructions encoded in at least one computer processable medium; and
the instructions operable upon processing to provide a service interface allowing a user of a remote communications device to select one or more geographic regions for which the user desires wireless service coverage for the remote communications device, receive via the service interface a request from the user for a wireless service at a particular geographic region selected by the user via the service interface, selectively determine an availability of the wireless service for at least two service providers available at the selected geographic region based on the request, generate a first response to the request based on the availability of the wireless service at the selected geographic region, the first response including one or more terms for the wireless service including at least one option between the service providers, communicate the first response to the remote communications device, and receive a second response to the first response, the second response selecting at least one of the at least two service providers to provide the wireless service.

27. The system of claim 26, wherein the computer implementable instructions comprise software stored on a computer-readable medium.

28. The system of claim 26, wherein the request identifies a time for the wireless service, the instructions operable upon processing to determine the availability of the wireless service at the selected geographic region at the time.

29. The system of claim 26, wherein the request identifies a bandwidth for the wireless service, the instructions operable upon processing to determine the availability of the wireless service at the selected geographic region for the bandwidth.

30. The system of claim 26, wherein the request identifies a type of service for the wireless service, the instructions operable upon processing to determine the availability of the wireless service at the selected geographic region for the type of service.

31. The system of claim 26, wherein the request identifies a price for the wireless service, the instructions operable upon processing to determine the availability of the wireless service at the selected geographic region at the price.

32. The system of claim 26, wherein the request identifies a network provider for the wireless service, the instructions operable upon processing to determine the availability of the wireless service at the selected geographic region from the network provider.

33. The system of claim 26, wherein the request identifies a service provider for the wireless service, the instructions operable upon processing to determine the availability of the wireless service at the selected geographic region from the service provider.

34. The system of claim 26, the terms in the response comprising a time for the wireless service.

35. The system of claim 26, the terms in the response comprising a price for the wireless service.

36. The system of claim 26, the terms in the response comprising a type of service for the wireless service.

37. The system of claim 26, the terms in the response comprising a bandwidth for the wireless service.

38. The system of claim 26, the terms and the response comprising a network provider for the wireless service.

39. The system of claim 26, the terms in the response comprising a service provider for the wireless service.

40. The system of claim 26, the response comprising an offer for the wireless service, the instructions operable upon processing to provide the wireless service in response to acceptance of the terms by a user.

41. The system of claim 26, the instructions operable upon processing to broadcast the request to a plurality of network providers each having a wireless access network covering at least part of the selected geographic region, to receive a service plan from at least one of the network providers, the service plan based on an availability of the wireless service at the selected geographic region in the wireless access network of the network provider, and to generate the response based on service plans from the network providers.

42. The system of claim 26, wherein providing the service interface comprises providing an Internet site including a graphical user interface configured to receive the user's request for the wireless service at the selected geographic region.

43. The system of claim 42, the graphical user interface configured to receive a plurality of service criteria, the service criteria comprising a geographic region, a price, a type of service, a bandwidth, and a time for the wireless service.

44. The system of claim 42, the graphical user interface further comprising a graphical map displaying geographic areas for selection of the geographic region for which the user desires wireless service coverage for the remote communications device.

45. The system of claim 26, wherein providing the service interface comprises providing a graphical user interface at a mobile device, the graphical user interface configured to receive the request for the wireless service at the selected geographic region.

46. The system of claim 45, the graphical user interface configured to receive a plurality of service criteria, the service criteria comprising a geographic region, a price, a type of service, a bandwidth, and a time for the wireless service.

47. The system of claim 45, the graphical user interface further comprising a graphical map displaying geographic areas for selection of the geographic region for which the user desires wireless service coverage for the remote communications device.

48. The system of claim 26, wherein providing the service interface comprises providing a telephony site including voice activated commands configured to receive the request for the wireless service at the selected geographic region.

49. The system of claim 26, the instructions operable upon processing to negotiate at least one of a plurality of service criteria for the wireless service with the user requesting the wireless service, the service criteria comprising a geographic region, a price, a type of service, a bandwidth, and a time for the wireless service.

50. The system of claim 49, wherein the service criteria comprises at least one of a network provider and a service provider.

51. An interface for a mobile communication device operable to use wireless services in connection with a wireless communications network, comprising:

computer implementable instructions encoded in at least one computer processable medium; and the instructions operable upon processing to provide a user interface configured to receive from a user of a remote communications device a plurality of service criteria for generating a request for wireless services at a geographic region, the service criteria comprising a geographic region for which the user desires wireless service coverage, a price, a type of service, a bandwidth, and a time for the wireless service, wherein the instructions are further operable upon processing to cause the request to be communicated to a centralized brokerage manager, wherein the user interface is further operable to display a response to the request comprising available wireless services and terms for the available wireless services at the geographic region selected by the user via the user interface, wherein the available wireless services are determined at the centralized brokerage device based on the service criteria and the terms include at least one option between at least two service providers of the requested wireless services, and wherein the user interface is further operable to receive a selection of at least one of the at least two service providers to provide the wireless service at the geographic region selected by the user via the user interface.

52. The system of claim 51, the service criteria further comprising at least one of a network provider and a service provider.

53. The system of claim 51, wherein the user interface is a graphical user interface.

54. The system of claim 53, the graphical user interface operable to display a graphical map illustrating geographic areas for selection of the geographic region for which the user desires wireless service coverage for the remote communications device.

55. The system of claim 51, wherein the user interface is a voice activated interface.

* * * * *